(12) United States Patent
Zhao et al.

(10) Patent No.: US 9,215,671 B2
(45) Date of Patent: Dec. 15, 2015

(54) ROUTING DEVICE AND SIGNAL TRANSMITTING METHOD FOR WIRELESS LOCAL AREA NETWORK

(75) Inventors: Yang Zhao, Shenzhen (CN); Xiwei Dong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 353 days.

(21) Appl. No.: 13/024,197

(22) Filed: Feb. 9, 2011

(65) Prior Publication Data

US 2011/0194543 A1 Aug. 11, 2011

(30) Foreign Application Priority Data

Feb. 11, 2010 (CN) .......................... 2010 1 0111663

(51) Int. Cl.
*H04W 52/28* (2009.01)
(52) U.S. Cl.
CPC .................................. *H04W 52/288* (2013.01)
(58) Field of Classification Search
CPC .................................................. H04W 52/288
USPC ............. 370/338, 311, 279; 455/444, 73, 453
See application file for complete search history.

(56) References Cited

U.S. PATENT DOCUMENTS

| 5,909,643 | A | 6/1999 | Aihara | |
|---|---|---|---|---|
| 2004/0146013 | A1* | 7/2004 | Song et al. | 370/279 |
| 2004/0180686 | A1 | 9/2004 | Takashi | |
| 2005/0079825 | A1 | 4/2005 | Omori et al. | |
| 2005/0090263 | A1 | 4/2005 | Ebata | |
| 2007/0010256 | A1 | 1/2007 | Klabunde et al. | |
| 2007/0171997 | A1 | 7/2007 | Weissman et al. | |
| 2007/0224951 | A1 | 9/2007 | Gilb et al. | |
| 2009/0059825 | A1 | 3/2009 | Rofougaran | |

(Continued)

FOREIGN PATENT DOCUMENTS

| CN | 2697958 Y | 5/2005 |
|---|---|---|
| CN | 101048953 A | 10/2007 |
| CN | 101448312 A | 6/2009 |

(Continued)

OTHER PUBLICATIONS

Office Action issued in corresponding Chinese Patent Application No. 201010111663.2, mailed May 22, 2012.

(Continued)

*Primary Examiner* — Khaled Kassim
(74) *Attorney, Agent, or Firm* — Brinks Gilson & Lione

(57) ABSTRACT

A routing device and a signal transmitting method for a Wireless Local Area Network (WLAN) are provided. The device includes: a radio frequency transmitting module, adapted to: generate radio network signals of the WLAN, and adjust the transmit power of the radio network signals according to power indication information; and an antenna module, adapted to transmit the radio network signals according to the adjusted transmit power. The method includes: generating radio network signals of the WLAN, and adjusting the transmit power of the radio network signals according to power indication information; and transmitting the radio network signals according to the adjusted transmit power. Through the routing device and the signal transmitting method, the radio network signals may be transmitted according to different transmit powers. Therefore, the routing device can meet the requirement for portability, fixed installation, and wide coverage.

3 Claims, 6 Drawing Sheets

(56) References Cited

U.S. PATENT DOCUMENTS

| | | |
|---|---|---|
| 2010/0144286 A1* | 6/2010 | Sorensen ..................... 455/73 |
| 2010/0167671 A1 | 7/2010 | Satoshi |

FOREIGN PATENT DOCUMENTS

| | | |
|---|---|---|
| CN | 101465678 A | 6/2009 |
| CN | 101742708 A | 6/2010 |
| EP | 0952683 A2 | 10/1999 |
| JP | 04260209 A | 9/1992 |
| JP | 6-85696 A | 3/1994 |
| JP | H6-085696 | 3/1994 |
| JP | 9-148852 A | 6/1997 |
| JP | 2001339317 A | 12/2001 |
| JP | 2005033238 A | 2/2005 |
| JP | 2005-130442 A | 5/2005 |
| JP | 2005130442 A | 5/2005 |
| JP | 2007-189736 A | 7/2007 |
| JP | 2007189736 A | 7/2007 |
| WO | WO 00/59119 A1 | 10/2000 |
| WO | WO 2008/102869 A1 | 8/2008 |

OTHER PUBLICATIONS

International Search Report issued in corresponding PCT Patent Application No. PCT/CN2011/070560, mailed May 5, 2010.

Office Action issued in corresponding Chinese Patent Application No. 201010111663.2, mailed Jan. 25, 2013.

Written Opinion of the International Searching Authority issued in corresponding PCT Patent Application No. PCT/CN2011/070560, mailed May 5, 2011.

Extended European Search Report issued in corresponding European Patent Application No. 11741855.8, mailed Jul. 11, 2012.

Office Action issued in corresponding Japanese Patent Application No. 2012-533474, mailed Sep. 3, 2013, 7 pages.

Office Action issued in corresponding European Patent Application No. 11 741 855.8; dated Jun. 10, 2013.

\* cited by examiner ant to the power indication information, the radio network signals can be transmitted according to different transmit powers, and the routing device can meet the requirement for wide coverage and portability.

ROUTING DEVICE AND SIGNAL TRANSMITTING METHOD FOR WIRELESS LOCAL AREA NETWORK

CROSS-REFERENCE TO RELATED APPLICATION

This application claims priority to Chinese Patent Application No. 201010111663.2, filed on Feb. 11, 2010, which is hereby incorporated by reference in its entirety.

FIELD OF THE APPLICATION

The present application relates to wireless communication technologies, and in particular, to a routing device and a signal transmitting method for a Wireless Local Area Network (WLAN).

BACKGROUND OF THE APPLICATION

Currently, the general wireless routing device such as a wireless routing device for accessing the 3G uplink WLAN can be divided in two types. One type is the wireless routing device that needs to cover a household area extending at least 100 meters (spacious environment), and needs to be capable of penetrating walls to some extent. This type of wireless routing device is with high power consumption, and requires an external power supply, and can be used only as a 3G wireless fixed terminal. That is, the radio network signals are transmitted at a high power to obtain wide coverage. The other type is the wireless routing device with a battery supply which reduces the transmit power to meet the portability requirement. This type of wireless routing device transmits radio network signals at a low power, and covers narrow areas.

In the process of implementing the present application, the inventor finds at least the following problems in the conventional art: The two types of wireless routing devices in the conventional art are unable to meet the requirement for portability and wide coverage such as household coverage.

SUMMARY OF THE APPLICATION

Embodiments below provide a routing device and a signal transmitting method for a WLAN to overcome the defect in the conventional art, namely, the routing devices of a WLAN in the conventional art are unable to meet the requirement for wide coverage and portability. The routing device provided herein covers a wide area such as a household area and is portable.

A routing device for a WLAN is provided in an embodiment. The routing device includes:
 a radio frequency transmitting module, adapted to: generate radio network signals of a WLAN, and adjust the transmit power of the radio network signals according to power indication information; and
 an antenna module, adapted to transmit the radio network signals according to an adjusted transmit power.

A signal transmitting method provided in an embodiment includes:
 generating radio network signals of a WLAN, and adjusting the transmit power of the radio network signals according to power indication information; and
 transmitting the radio network signals according to the adjusted transmit power.

Through the routing device and the signaling transmitting method, the generated radio network signals are adjusted according to the power indication information, the radio network signals can be transmitted according to different transmit powers, and the routing device can meet the requirement for wide coverage and portability.

BRIEF DESCRIPTION OF THE DRAWINGS

To make the technical solution in the present invention or in the conventional art clearer, the following outlines the accompanying drawings for illustrating the embodiments or the conventional art. Apparently, the accompanying drawings outlined below are exemplary only, and persons of ordinary skill in the art can derive other drawings from such accompanying drawings without creative effort.

DETAILED DESCRIPTION OF THE EMBODIMENTS

The following detailed description is given with reference to the accompanying drawings. The drawings and the detailed description are merely representative, and the embodiments are regarded as illustrative in nature and not exhaustive or restrictive. The embodiments may be modified by those skilled in the art without departing from the scope of the claims.

Figure 1:
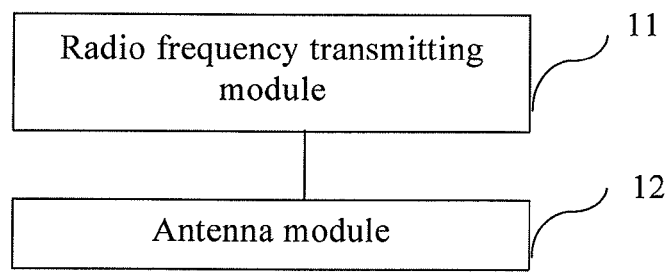
FIG. 1 shows a structure of a routing device for a WLAN according to a first embodiment.

Considering that the routing devices for the WLAN in the conventional art are unable to meet the requirement for household coverage and portability, the embodiments provide a routing device for a WLAN. FIG. 1 shows a structure of a routing device for a WLAN in the first embodiment. As shown in FIG. 1, the device includes: a radio frequency transmitting module 11, adapted to: generate radio network signals of a WLAN, and adjust the transmit power of the radio network signals according to power indication information; and an antenna module 12, adapted to transmit the radio network signals according to the adjusted transmit power.

Through the routing device of the WLAN provided in the above-mentioned embodiment, the radio frequency transmitting module can adjust the radio network signals according to the power indication information, and transmit the radio network signals according to different transmit powers. Therefore, the routing device can meet the requirement for wide coverage and portability.

Figure 2:
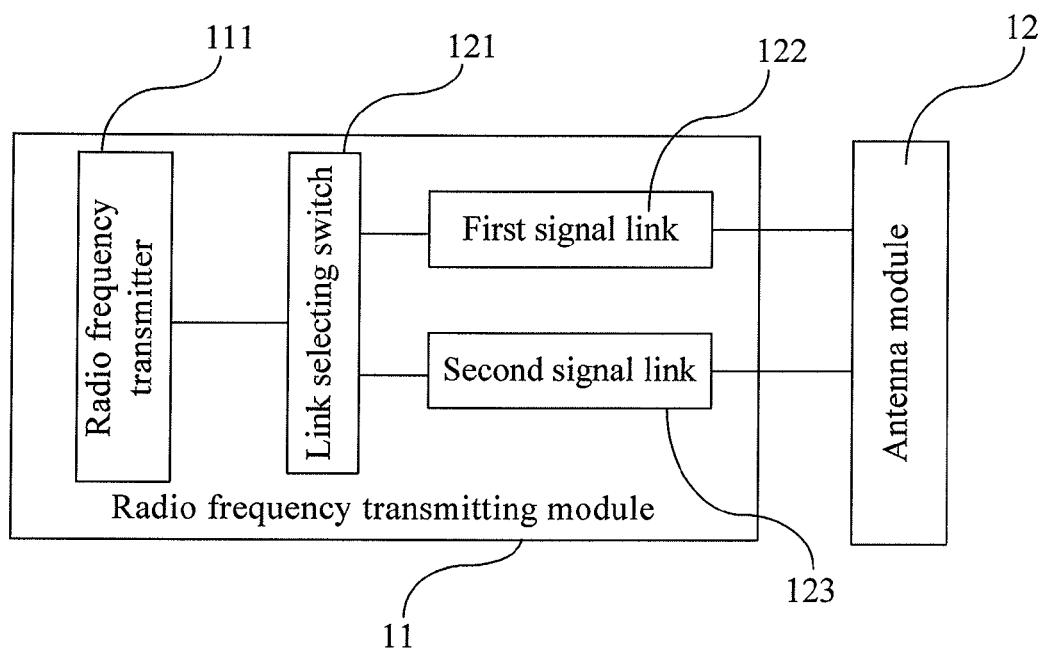
FIG. 2 shows a structure of a routing device for a WLAN according to a second embodiment.

On the basis of the foregoing embodiment, the radio frequency transmitting module in the foregoing embodiment includes a radio frequency transmitter and a power adjusting module. As shown in FIG. 2, the radio frequency transmitter 111 is adapted to generate radio network signals of the WLAN; and the power adjusting module may further include a link selecting switch 121, a first signal link 122, and a second signal link 123. The link selecting switch 121 is adapted to choose whether to connect the radio frequency transmitter 111 to the antenna module 12 through the first signal link 122 or the second signal link 123 according to the power indication information. A Power Amplifier (PA) is set on the second signal link 123.

In this embodiment, the power adjustment is equivalent to a link selection process. A PA is set on the second signal link. After the radio frequency transmitter transmits the radio network signals at a lower power. If the radio network signals are transmitted through the second signal link, the signals may be amplified by a PA on the link. In this way, the antenna module can transmit the radio network signals at a higher power. However, the radio network signals transmitted through the first signal link are not amplified, and the antenna module can transmit the radio network signals at a lower power. In the implementation process, the first signal link is selected for transmitting the signals to meet the portability requirement; when the routing device needs to cover a wide area, the second signal link is selected for transmitting the signals to accomplish a higher transmit power and wider coverage.

Figure 3:
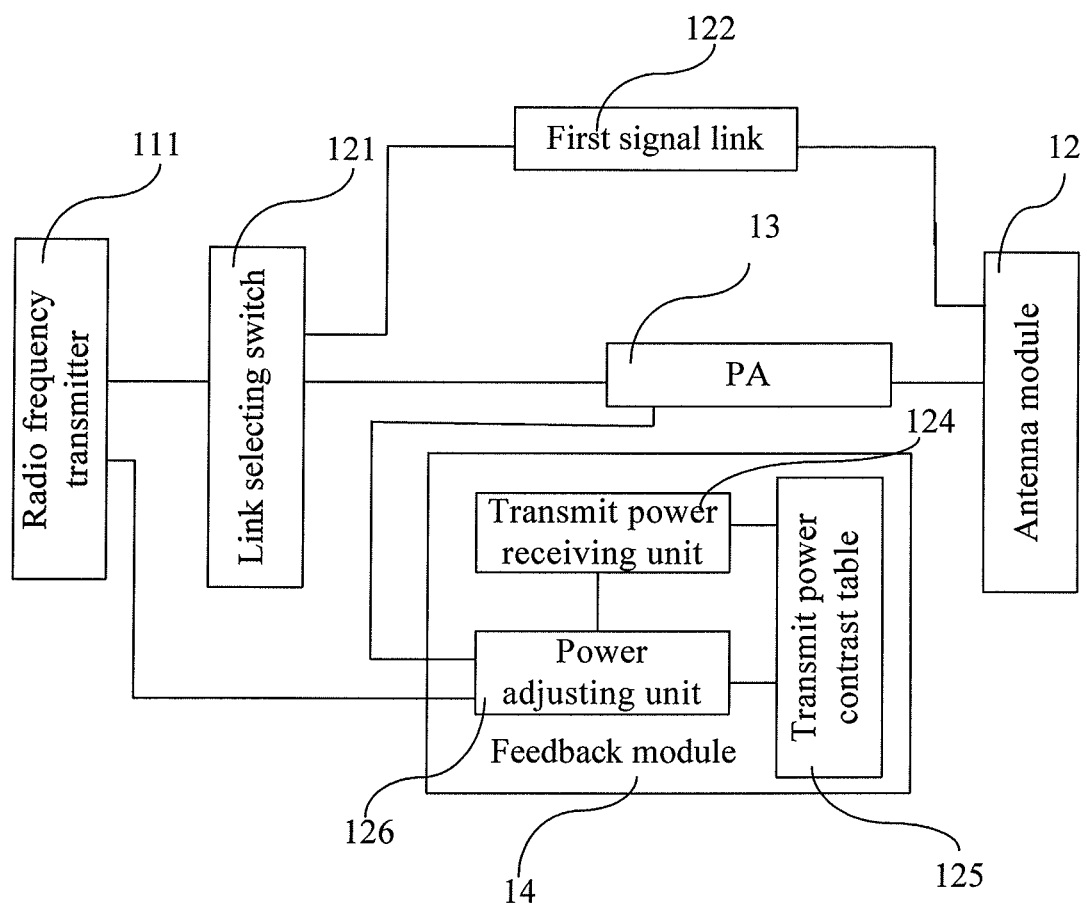
FIG. 3 shows a structure of a routing device for a WLAN according to a third embodiment.

As shown in FIG. 3, if the second signal link is selected in the foregoing embodiment, a feedback module 14 may be set between the radio frequency transmitter 111 and the PA 13. The feedback module includes a transmit power receiving unit 124, a transmit power contrast table 125, and a power adjusting unit 126. The transmit power receiving unit 124 is adapted to receive the target transmit power information of the radio network signals transmitted by the antenna module. The power adjusting unit 126 is adapted to search the transmit power contrast table 125 for the output power of the radio frequency transmitter according to the target transmit power information. The transmit power contrast table 125 includes at least two mapping relations between the output power of the radio frequency transmitter and the transmit power of the antenna module. The radio frequency transmitter 111 is adapted to generate radio network signals of the WLAN according to the found output power.

In all embodiments above, the routing device of the WLAN may further include a judging module. This module is adapted to: generate the power indication information for transmitting signals through the second signal link when the routing device is powered by an external power supply, and generate the power indication information for transmitting signals through the first signal link when the routing device is powered by a battery. The judging module judges whether the routing device is powered by an external power supply. If the routing device is powered by an external power supply, it is determined that a utilizing manner of fixed setting for the routing device is adopted, namely, the signals can be transmitted through the second signal link. The PA on the second signal link can amplify the radio network signals and widen the coverage of the signals.

A first signal link and a second signal link are set in the foregoing embodiment, and a PA is set on the second signal link. Therefore, the radio network signals can be transmitted at a high power, and the coverage of the signals is widened. When the signals are transmitted through the first signal link without a PA, the routing device can be powered by a battery, and is therefore portable and reduces the power consumption. Besides, a contrast table that stores at least the mapping relation between the output power of the radio frequency transmitter and the transmit power may be set in the second signal link, and the output power of the radio frequency transmitter can be adjusted according to different target transmit powers.

Figure 4:
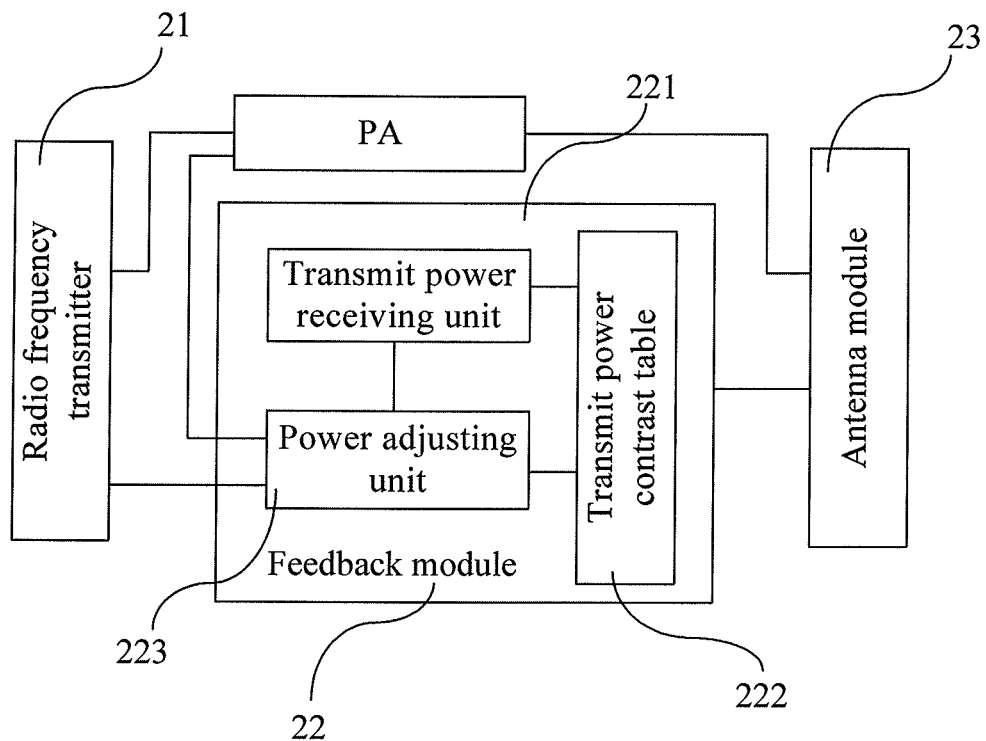
FIG. 4 shows a structure of a routing device for a WLAN according to the third embodiment.

Unlike the routing device of the WLAN in the foregoing embodiment, the routing device in another embodiment has no first signal link, but uses the second signal link to provide different transmit powers. As shown in FIG. 4, the routing device in this embodiment includes a radio frequency transmitter 21, a feedback module 22, an antenna module 23, and a PA 24. The radio frequency transmitter 21, the feedback module 22, and the PA 24 form a radio frequency transmitting module. The feedback module 22 includes a transmit power receiving unit 221, a transmit power contrast table 222, and a power adjusting unit 223. The transmit power receiving unit 221 is adapted to receive the target transmit power information (namely, power indication information) transmitted by the antenna module. The transmit power contrast table 222 includes at least two mapping relations between the output power of the radio frequency transmitter and the transmit power of the antenna module. The power adjusting unit 223 is adapted to search the transmit power contrast table for the output power of the radio frequency transmitter according to the target transmit power information. The radio frequency transmitter 21 is adapted to generate radio network signals of the WLAN according to the found output power.

The transmit power contrast table may further include at least two mapping relations between the output power of the radio frequency transmitter, the detection voltage of the PA, and the transmit power of the antenna module. The power adjusting unit is adapted to search the transmit power contrast table for the detection voltage of the PA and the output power of the radio frequency transmitter according to the target transmit power information. The radio frequency transmitter is adapted to generate radio network signals of the WLAN according to the found output power if the found detection voltage of the PA is different from the detected detection voltage of the PA.

In the previous embodiment, the transmit power contrast table does not include the detection voltage of the PA, and the power adjusting unit searches the transmit power contrast table for the output power of the radio frequency transmitter for adjustment directly after receiving the target transmit power information. In the case that the transmit power contrast table stores the detection voltage of the PA, detection may be performed to check whether the detection voltage of the current PA is the same as the found detection voltage of the PA after the target transmit power information is received. If they are the same, the output power of the current radio frequency transmitter, and the transmit power of the antenna module meet the requirement of the target transmit power, and it is not necessary to adjust the output power of the radio frequency transmitter.

Moreover, a signal receiving link and a radio frequency receiver may be set on the routing device for the WLAN, and the antenna module includes an antenna and a transmit-receive selection switch. The antenna is adapted to receive or transmit radio network signals. The transmit-receive selection switch is adapted to control the antenna to connect to the signal receiving link or the power adjusting module. When the antenna is connected to the power adjusting module, the signal transmitting process applies; when the antenna is connected to the signal receiving link, the signal receiving process applies. The radio frequency receiver may be integrated with the radio frequency transmitter.

In the routing device of the WLAN in the foregoing embodiments, the antenna module may further include a transmit-receive filter, which is able to perform filtering during transmitting and receiving signals. Additionally, a transmit filter may be set on the signal receiving link.

In the foregoing embodiment, a balun may be set between the radio frequency transmitter and the power adjusting module, and a balun may be set between the radio frequency transmitter and the signal receiving link.

Figure 5:
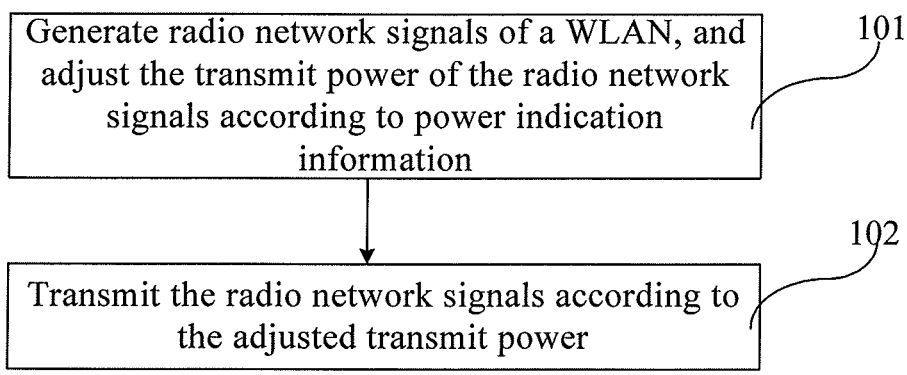
FIG. 5 is a flowchart of a signal transmitting method according to an embodiment.

Corresponding to the foregoing embodiment of routing device of the WLAN, a signal transmitting method is provided in an embodiment. FIG. 5 is a flowchart of a signal transmitting method in an embodiment. As shown in FIG. 5, the method includes the following steps:

Step 101: Generate radio network signals of a WLAN, and adjust the transmit power of the radio network signals according to power indication information.

Step 102: Transmit the radio network signals according to an adjusted transmit power.

Through the signal transmitting method of the routing device of the WLAN provided by the above-mentioned embodiment, the radio network signals are adjusted according to the power indication information, and are transmitted according to different transmit powers. Therefore, the routing device can meet the requirement for portability, fixed installation, and wide coverage.

The transmit power of the radio network signals may be adjusted according to the power indication information in two modes. That is, the first signal link or the second signal link is selected as a communication link between the radio frequency transmitter and the antenna module according to the power indication information, and a PA is set on the second signal link. In this embodiment, two communication links are set. A PA is set on one of the communication links. When the radio network signals are transmitted through the communication link on which a PA is set, the radio network signals are output at a higher power, the transmit power of the antenna module is increased, and the coverage of the signals is widened.

The power indication information in the foregoing embodiment may be generated according to whether the routing device is powered by an external power supply. If the routing device is powered by an external power supply, the power indication information is generated for transmitting the radio network signals through the second signal link; otherwise, the power indication information is generated for transmitting the radio network signals through the first signal link.

In another implementation mode, the transmit power of the radio network signals is adjusted according to the power indication information in the following way: Search the transmit power contrast table for the output power of the radio frequency transmitter according to the target transmit power information of radio network signals; and generate radio network signals of the WLAN according to the output power. The transmit power contrast table includes at least two mapping relations between the output power of the radio frequency transmitter and the transmit power of the antenna module.

Further, the transmit power contrast table includes at least two mapping relations between the output power of the radio frequency transmitter, the detection voltage of the PA, and the transmit power of the antenna module. In this case, the step of searching the transmit power contrast table for the output power of the radio frequency transmitter according to the target transmit power information and generating radio network signals of the WLAN according to the output power includes:

searching the transmit power contrast table for the detection voltage of the PA according to the target transmit power information; and generating the radio network signals according to the output power of the radio frequency transmitter obtained from the transmit power contrast table and corresponding to the target transmit power information if the found detection voltage of the PA is different from the detected detection voltage of the PA. Namely, judging whether the current transmit power is the target transmit power by detecting the detection voltage of the PA before adjusting the output power of the radio frequency transmitter.

Through the routing device and the signal transmitting method for the WLAN in the foregoing embodiments, the transmit power of the routing device is adjusted so that the radio network signals can be output according to different transmit powers and can cover different ranges. That is, the routing device can meet the requirement for portability, fixed installation, and wide coverage.

Figure 6:
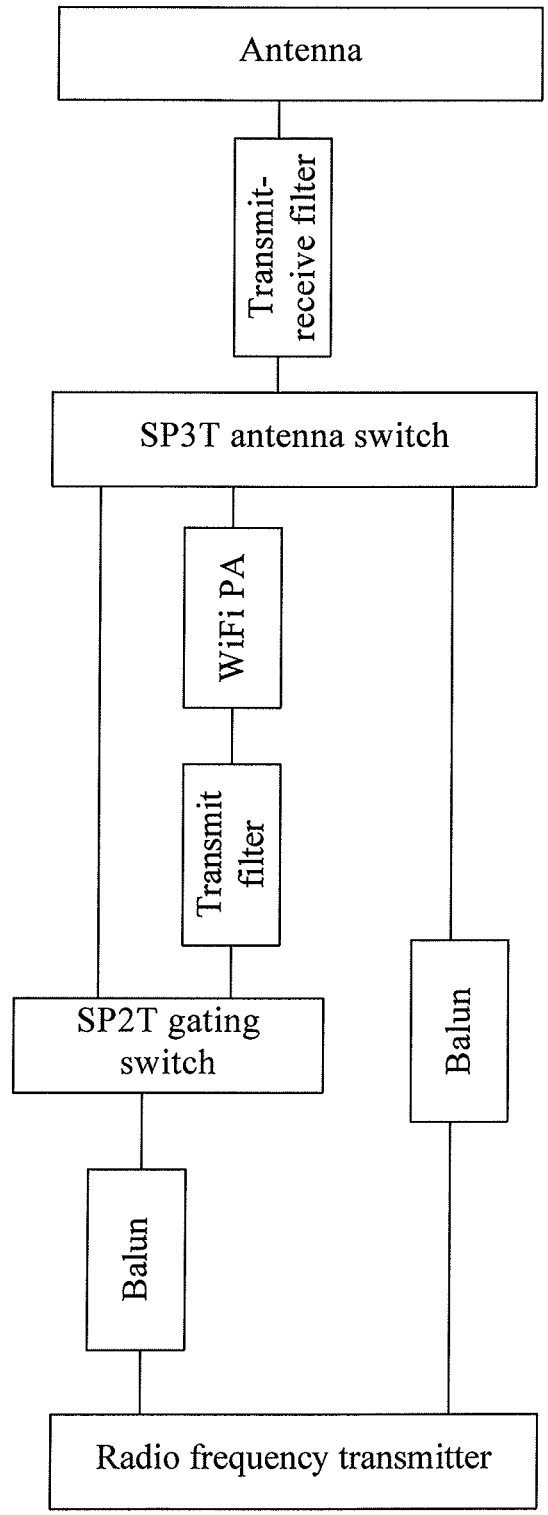
FIG. 6 shows a system structure according to an embodiment.

Described below is an embodiment. FIG. 6 shows a system structure in an embodiment. As shown in FIG. 6, the routing device in this embodiment is a Wireless Fidelity (WiFi) radio frequency front end. Specifically, the routing device may work with a PA or without a PA.

When the routing device works with a PA, the radio frequency transceiver generates radio network signals, and the radio network signals pass through a differential-to-single balun and arrive at a single-pole double-throw (SP2T) switch. The radio network signals pass through the gating switch of SP2T, and arrive at the transmit filter, WiFi PA, SP3T antenna switch, transmit-receive filter, and are finally output through the antenna. At the time of receiving the signals, after the antenna receives the WiFi signals, the signals pass through the transmit-receive filter, SP3T antenna switch, and single-to-differential balun, and enter the radio frequency transceiver.

When the routing device works without a PA, the radio frequency transceiver outputs radio network signals, and the radio network signals pass through a differential-to-single balun and arrive at the gating switch of SP2T. After passing through the gating switch of SP2T, the radio network signals arrive at the SP3T antenna switch, transmit-receive filter, and are finally output through the antenna. At the time of receiving the signals, after the antenna receives the WiFi signals, the signals pass through the transmit-receive filter, SP3T antenna switch, and single-to-differential balun, and enter the radio frequency transceiver.

The two working modes provided in the forgoing embodiment are independent of each other, and share the same signal receiving path. As regards the signal transmitting path, one path has an external PA, and the signals are amplified by the PA and then output; the other path has no PA, and the signals are output by the radio frequency transceiver directly. In the specific implementation process, different scripts may be invoked by software to implement functions of the SP2T switch and the SP3T switch in the foregoing implementation process.

Figure 7:
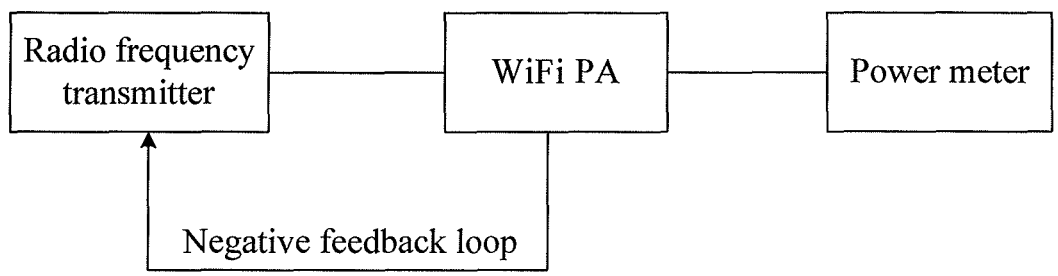
FIG. 7 shows WiFi transmit power calibration according to an embodiment.

In addition, a transmit power contrast table may be generated by means of feedback calibration. This contrast table includes at least two mapping relations between the output power of the radio frequency transmitter, the detection voltage of the PA, and the transmit power of the antenna module. FIG. 7 shows WiFi transmit power calibration in an embodiment. As shown in FIG. 7, the implementation of the WiFi transmit power calibration is based on a negative feedback circuit. At the beginning of the calibration, software controls the radio frequency transmitter to transmit radio network signals at a certain power. After the signals are amplified by the WiFi PA, a power meter may be used to measure the transmit power output to the antenna. Meanwhile, the detection voltage of the WiFi PA may be measured. The calibration as a whole is an open-loop process. Finally, a parameter table is generated. The table includes at least two mapping relations between the output power of the radio frequency transmitter, the detection voltage of the WiFi PA, and the transmit power of the antenna. A detailed result is as follows:

| Output Power (V) | Detection Voltage (V) | Transmit Power (dBm) |
| --- | --- | --- |
| 10 | 22 | 0 |
| 11 | 24 | 0.5 |
| 12 | 26 | 1 |
| 13 | 28 | 1.5 |
| 14 | 30 | 2 |
| 15 | 32 | 2.5 |
| 16 | 34 | 3 |
| 17 | 36 | 3.5 |
| 18 | 38 | 4 |
| 19 | 40 | 4.5 |
| 20 | 42 | 5 |
| 21 | 44 | 5.5 |
| 22 | 46 | 6 |
| 23 | 48 | 6.5 |
| 24 | 50 | 7 |
| 25 | 52 | 7.5 |
| 26 | 54 | 8 |
| 27 | 56 | 8.5 |
| 28 | 58 | 9 |
| 29 | 60 | 9.5 |
| 30 | 62 | 10 |
| 31 | 64 | 10.5 |
| 32 | 66 | 11 |
| 33 | 68 | 11.5 |
| 34 | 70 | 12 |
| 35 | 72 | 12.5 |
| 36 | 74 | 13 |
| 37 | 76 | 13.5 |
| 38 | 78 | 14 |
| 39 | 80 | 14.5 |
| 40 | 82 | 15 |
| 41 | 84 | 15.5 |
| 42 | 86 | 16 |
| 43 | 88 | 16.5 |
| 44 | 90 | 17 |
| 45 | 92 | 17.5 |
| 46 | 94 | 18 |
| 47 | 96 | 18.5 |
| 48 | 98 | 19 |
| 49 | 100 | 19.5 |
| 50 | 102 | 20 |

The foregoing parameter contrast table shows the output power of the radio frequency transceiver and the detection voltage of the WiFi PA when the transmit power falls within 0-15 dBm. When the target transmit power is set to 15 dBm, "pcdac=40, pdadc=82, pwr=15" can be obtained through software. When the WiFi works, the radio frequency transmitter judges whether the value of pdadc is 82; if not, the radio frequency transmitter adjusts the value of pcdac to stabilize it at 82. In this way, the transmit power is 15 dBm fixedly.

Likewise, the transmit power of WiFi may be modified through modifying the setting item of calibrating the target transmit power. According to the calibrated power range, the output power may be any value from 0 dBm to 20 dBm, and the precision can be controlled at 0.5 dBm. Calibration parameters with different settings only need to be invoked by software.

Figure 8:
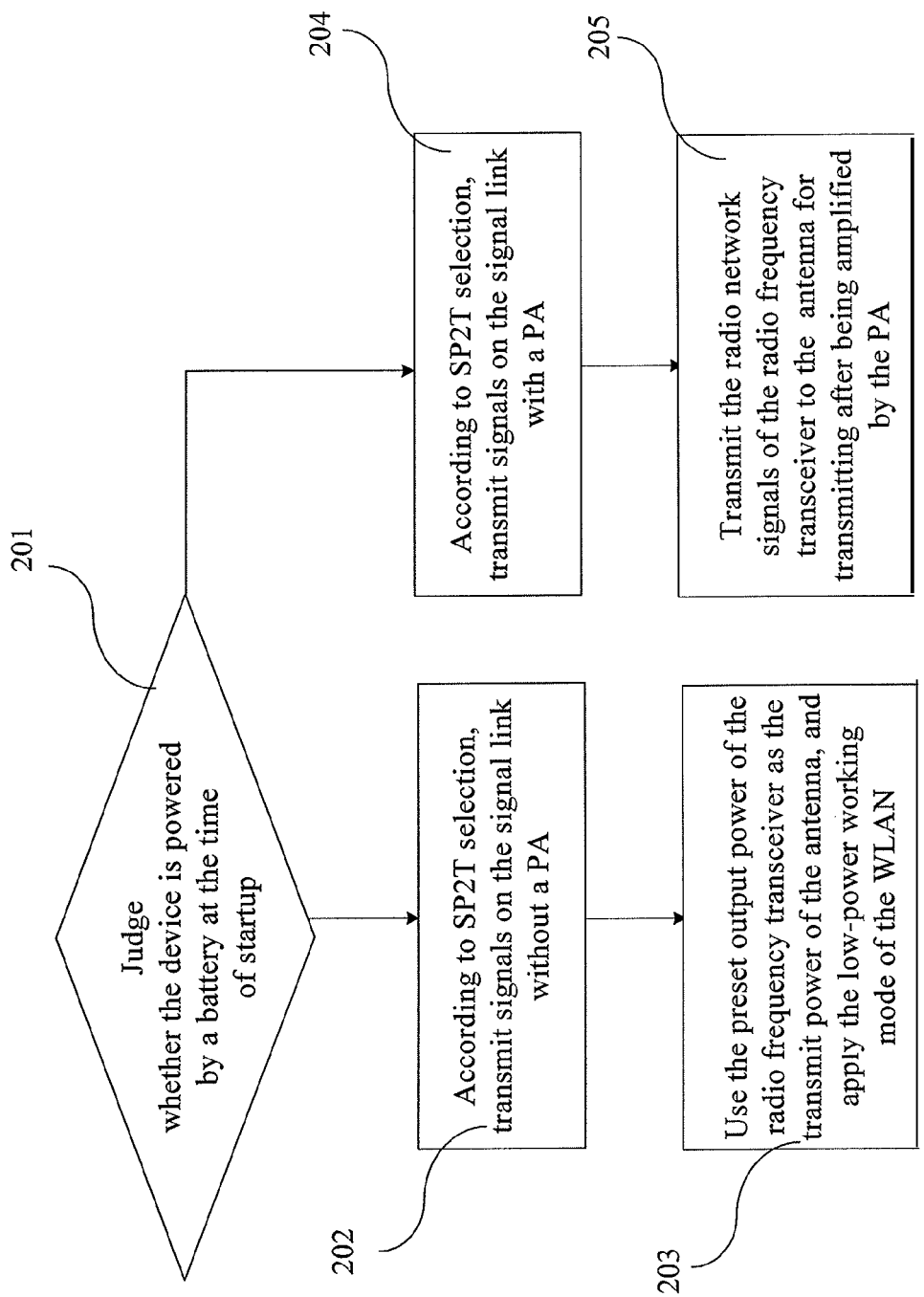
FIG. 8 is a flowchart of an embodiment.

In the implementation process, the transmit power and the power consumption of the routing device are low when the routing device is taken along, and therefore the routing device may be powered by a battery. When the routing device is installed on a fixed site, the routing device is generally powered by an external power supply. Therefore, the working mode can be switched according to whether the device is powered by a battery. As shown in FIG. 8, the detailed process is as follows:

Step 201: At the time of startup, judge whether the device is powered by a battery; if so, proceed to step 202; if not, go to step 204.

Step 202: According to SP2T selection, transmit signals through the signal link without a PA.

Step 203: Use the preset output power of the radio frequency transceiver as the transmit power of the antenna, and apply the low-power working mode of the WLAN.

Step 204: Through SP2T selection, transmit the signals through the signal link with a PA; meanwhile, select one of the transmit powers according to the transmit power parameter contrast table obtained through calibration in the foregoing embodiment, and adjust the output power of the radio frequency transmitter to a preset value.

Step 205: Transmit the radio network signals of the radio frequency transceiver to the antenna after being amplified by the PA, whereupon the antenna transmits the radio network signals at a high transmit power to apply the high-power working mode of the WLAN.

In practical applications, it is practicable that only the path with a PA is applied, namely, two target transmit powers are selected from the transmit power parameter contrast table to serve as the power in high-power output mode and the power in low-power output mode respectively; and the radio frequency transceiver can be adjusted to a corresponding power to implement the high-power output mode and the low-power output mode.

Through the routing device and signal transmitting method for the WLAN in the foregoing embodiment, the radio network signals generated by the radio frequency transmitter are adjusted according to the power indication information, and are transmitted according to different transmit powers. Therefore, the routing device can meet the requirement for portability, fixed installation, and wide coverage.

Persons of ordinary skill in the art should understand that all or a part of the steps of the method according to the embodiments may be implemented by a program instructing relevant hardware. The program may be stored in a computer readable storage medium. When the program runs, the steps of the method according to the embodiments are performed. The storage medium may be any medium that is capable of storing program codes, such as a Read Only Memory (ROM), a Random Access Memory (RAM), a magnetic disk, or a Compact Disk-Read Only Memory (CD-ROM).

Finally, it should be noted that the above embodiments are merely provided for describing the technical solutions, but are not limitations on the claims. It is apparent that persons skilled in the art may make various modifications and variations to the embodiments without departing from the spirit and scope of the claims. The claims are intended to cover the modifications and variations provided that they fall in the scope of protection defined by the following claims or their equivalents.

What is claimed is:

1. A routing device for a Wireless Local Area Network (WLAN), comprising:
   a radio frequency (RF) transmitting module, adapted to: generate radio network signals of the WLAN, and adjust a RF transmit power of the radio network signals according to RF power indication information;
   an antenna module, adapted to transmit the radio network signals according to an adjusted RF transmit power;
   the radio frequency transmitting module comprises a radio frequency transmitter and a RF power adjusting module, wherein:
   the radio frequency transmitter is adapted to generate the radio network signals of the WLAN;
   the RF power adjusting module comprises a RF signal link selecting switch selecting to transmit the radio network signals to the antenna module through either a first RF signal link or a second RF signal link according to the RF power indication information; and, wherein:

the radio network signals when transmitted through the first RF signal link, are both not amplified and being transmitted at a lower RF power without an amplifier, than the second RF signal link; and the radio network signals when transmitted through the second RF signal link, are both amplified and being transmitted at a higher RF power than the first RF signal link;

the routing device enabled to be powered by either an external power supply or a battery, wherein the routing device further comprising a judging module adapted to:

generate the RF power indication information for transmitting the radio network signals through the second RF signal link, when the routing device is powered by the external power supply, or generate the RF power indication information for transmitting the radio network signals through the first RF signal link, when the routing device is powered by the battery, wherein: the radio frequency transmitting module comprises a radio frequency transmitter, a Power Amplifier (PA) which is set on the second RF signal link, and a feedback module located between the PA and the radio frequency transmitter;

the feedback module comprises a transmit power receiving unit, a RF power adjusting unit, and a transmit power contrast table;

the transmit power receiving unit is adapted to receive the power indication information transmitted by the antenna module;

the RF power adjusting unit is adapted to search the transmit power contrast table for an output power of the radio frequency transmitter according to target transmit power information;

the transmit power contrast table comprises at least two mapping relations between the output power of the radio frequency transmitter and the transmit power of the radio network signals transmitted by the antenna module; and the radio frequency transmitter is adapted to generate the radio network signals of the WLAN according to a found output power.

2. The routing device according to claim, wherein:

the transmit power contrast table comprises at least two mapping relations between the output power of the radio frequency transmitter, a detection voltage of the PA, and the transmit power of the antenna module;

the RF power adjusting unit is adapted to search the transmit power contrast table for the detection voltage of the PA and the output power of the radio frequency transmitter according to the target transmit power information; and the radio frequency transmitter is adapted to generate the radio network signals of the WLAN according to the found output power if a found detection voltage of the PA is different from the detected detection voltage of the PA.

3. A radio frequency (RF) signal transmitting method, comprising:

generating radio network signals of a Wireless Local Area Network (WLAN); adjusting a transmit power of the radio network signals according to RF power indication information; and transmitting the radio network signals according to an adjusted RF transmit power; wherein adjusting the transmit power of the radio network signals according to the RF power indication information comprises:

selecting to transmit the radio network signals via either a first RF signal link or a second RF signal link as being a RF communication link between a radio frequency transmitter and an antenna module according to the RF power indication information, wherein:

the radio network signals when transmitted through the first RF signal link, are both not amplified and being transmitted at a lower RF power without an amplifier, than the second RF signal link; and a Power Amplifier (PA), amplifies the radio network signals at a higher RF power than the first RF signal link when the radio network signals are being transmitted in is set on the second RF signal link;

the RF power indication information of the radio network signals is generated according to whether a routing device is powered by either an external power supply or powered by a battery, wherein:

the generated RF power indication information of the radio network signals is generated to be transmitted through the second RF signal link, if the routing device is powered by the external power supply; and the generated RF power indication information of the radio network signals is to be transmitted through the first RF signal link, if the routing device is not powered by the battery, wherein:

the routing device comprises a radio frequency transmitting module comprising: a radio frequency transmitter, a Power Amplifier (PA) which is set on the second RF signal link, and a feedback module located between the PA and the radio frequency transmitter;

the feedback module comprises a transmit power receiving unit, a RF power adjusting unit, and a transmit power contrast table;

the transmit power receiving unit is adapted to receive the power indication information transmitted by the antenna module;

the RF power adjusting unit is adapted to search the transmit power contrast table for an output power of the radio frequency transmitter according to target transmit power information;

the transmit power contrast table comprises at least two mapping relations between the output power of the radio frequency transmitter and the transmit power of the radio network signals transmitted by the antenna module; and the radio frequency transmitter is adapted to generate the radio network signals of the WLAN according to a found output power.

* * * * *